United States Patent
Toshitani et al.

(10) Patent No.: US 10,593,368 B2
(45) Date of Patent: Mar. 17, 2020

(54) AUDIO DEVICE WHICH SYNCHRONIZES AUDIO DATA

(71) Applicant: Yamaha Corporation, Shizuoka-ken (JP)

(72) Inventors: Masafumi Toshitani, Hamamatsu (JP); Hisashi Iida, Hamamatsu (JP); Yuki Suemitsu, Hamamatsu (JP)

(73) Assignee: YAMAHA CORPORATION, Shizuoka-Ken (JP)

( * ) Notice: Subject to any disclaimer, the term of this patent is extended or adjusted under 35 U.S.C. 154(b) by 0 days.

(21) Appl. No.: 15/871,820

(22) Filed: Jan. 15, 2018

(65) Prior Publication Data

US 2019/0221236 A1 Jul. 18, 2019

(51) Int. Cl.
*H04J 3/06* (2006.01)
*G11B 27/10* (2006.01)
*G11B 27/036* (2006.01)

(52) U.S. Cl.
CPC ............ *G11B 27/10* (2013.01); *G11B 27/036* (2013.01); *H04J 3/0632* (2013.01)

(58) Field of Classification Search
CPC .................................................. H04J 3/0632
USPC ....... 379/82; 370/412, 509, 516, 503; 327/3; 700/94; 386/207; 704/500
See application file for complete search history.

(56) References Cited

U.S. PATENT DOCUMENTS

| | | | | |
|---|---|---|---|---|
| 5,063,589 | A | * 11/1991 | Tsushima | ............... H04M 1/654 379/82 |
| 6,751,228 | B1 | * 6/2004 | Okamura | .............. H04J 3/0632 370/412 |
| 2007/0285132 | A1 | * 12/2007 | Oh | ........................ H03D 13/004 327/3 |
| 2008/0008281 | A1 | 1/2008 | Abrol et al. | |
| 2008/0298399 | A1 | 12/2008 | Gou et al. | |
| 2008/0298532 | A1 | 12/2008 | Wang | |
| 2009/0135854 | A1 | 5/2009 | Bettin et al. | |
| 2015/0235668 | A1 | * 8/2015 | Takabayashi | ........ G11B 27/007 386/207 |
| 2017/0099712 | A1 | * 4/2017 | Hilgers | .............. H05B 33/0815 |

FOREIGN PATENT DOCUMENTS

| | | | | |
|---|---|---|---|---|
| JP | 2004-357096 A | | 12/2004 | |
| JP | 2011-160272 A | | 8/2011 | |
| JP | WO 2014104039 A1 | * | 7/2014 | ............... H04S 1/00 |

OTHER PUBLICATIONS

European Search Report for corresponding EP application EP 19 15 1568, dated Jun. 13, 2019, pp. 1-11.

* cited by examiner

*Primary Examiner* — Md S Elahee
(74) *Attorney, Agent, or Firm* — HEA Law PLLC

(57) ABSTRACT

An audio device, which is configured to receive audio data from anther device, comprises a memory that stores instructions and a processor. The processor is configured to execute the instructions stored in the memory to: receive the audio data and a time stamp attached to the audio data, output a pulse data having a predetermined length, detect end time of the pulse data, compare the end time of the pulse data and the time stamp, adjust the audio data based on the comparing result, and output the adjusted audio data.

15 Claims, 12 Drawing Sheets

Related Art

US 10,593,368 B2

AUDIO DEVICE WHICH SYNCHRONIZES AUDIO DATA

TECHNICAL FIELD

The present disclosure relates to an audio device which synchronizes the playback of audio data with one or more other devices which are connected through a communication network, and an audio device which synchronizes an audio clock with one or more devices which are connected through the communication network.

BACKGROUND

In a system which includes a server 1 and a client device 2 that receives audio data from the server 1 as shown in FIG. 1, measures to synchronize the audio data between the server 1 and the client device 2 have been taken. In synchronizing the audio data between the server 1 and the client device 2, it is important to detect output timing of the audio data from the client device 2, or a delay within the client device 2. That is, in the system as shown in FIG. 1, a delay occurs from a receipt of the audio data by the client device 2 (i.e., writing of the audio data to a buffer memory) to the outputting of the audio data by the client device 2. This delay is mainly caused by software processing in the client device 2, and thus the delay time corresponds to time required for the processing by a control unit 23 such as CPU (a central control unit) at the client device 2. This delay time may be estimated. However, it is difficult to estimate or calculate the delay time precisely. Thus, to address this issue, it is necessary to accurately detect the delay time within the client device or detect the accurate output time of the audio data from the client device.

A delay also occurs at a DAC (Digital Analog Converter) 3, which receives the audio data and the audio clock from the control unit 23 and outputs the processed audio data to a speaker 4. The delay at the DAC 3 depends on the specific hardware of the DAC 3, and thus the delay time is generally constant and fixed. Thus, it is more important to address the delay at the client device 2.

In addition, each of the server 1 and the client device 2 generates a respective audio clock, and plays back the audio data based on the respective audio clock. Thus, when there is a phase difference between the audio clock of the server 1 and the audio clock of the client device 2, a time lag occurs between the playback by the server 1 and the playback by the client device 2.

Prior attempts disclose steps to synchronize the audio data between two or more devices. For example, Japanese Patent Application Publication No. 2004-357096 discloses that a server calculates a number of clock pulses of a server clock signal and sends the calculated number of the clock pulses to a client device. The client device also calculates a number of clock pulses of a client clock signal, and compares the received number of the clock pulses of the server clock signal and the calculated number of the clock pulses of the client clock signal. Then, the client device adjusts the frequency of the client clock signal based on the results of the comparison.

In addition, Japanese Patent Application Publication No. 2011-160272 discloses that the client device adjusts a frequency divider based on a difference between time T_Time, when the server transmits an audio frame to the client device, and time R_Time, when the client device receives it. In addition, the 2011-160272 publication discloses adjusting the frequency of the audio clock based on the difference between time P_Time, attached to the audio data, and the time R_Time, when the client device receives it.

SUMMARY

An object of the present application is to provide an audio device, where the precise output time of the audio data is detected and the audio data is adjusted based on the detected output time, thereby synchronizing the start of the playback of the audio data. Another object is to provide an audio device, where a timing of an outputted audio clock is constantly detected and a speed of the audio clock is adjusted based on the detected timing, thereby eliminating the phase difference between a time stamp attached to the audio data and the audio clock within a predetermined period after the audio clock is initially output. Another object is to provide an edge detection mechanism which measures an edge time of data, thereby ensuring an accurate detection of the output time by the audio device and thus achieving the above results in the client device. Another object is to provide an audio device where the server is not required to take any measures to synchronize the server and the client device.

To achieve these objects, one aspect of the invention relates to an audio device which is configured to receive audio data from another device, where the audio device comprises a memory which stores instructions and pulse data having a predetermined length, and a processor that is configured to execute the instructions to: receive the audio data and a time stamp attached to the audio data, output the pulse data having the predetermined length, the pulse data being output when the audio device receives the audio data, detect end time of the pulse data, compare the end time of the pulse data and the time stamp, adjust the audio data based on the comparing result, and output the adjusted audio data, the adjusted audio data being output after the pulse data is output.

One aspect of the invention relates to an audio device which is configured to receive audio data from anther device, where the audio device comprises: a memory which stores instructions, and a processor that is configured to execute the instructions to: receive the audio data and a time stamp attached to the audio data, output the audio data and an audio clock, detect edge time of the audio clock, determine whether there is a phase difference between the edge time of the audio clock and the time stamp, and adjust a speed of the audio clock based on the determining result so that the phase difference between the edge time of the audio clock and the time stamp is eliminated.

One aspect of the invention relates to an audio device which is configured to receive audio data from anther device, where the audio device comprises: a memory which stores instructions and pulse data having a predetermined length, and a processor that is configured to execute the instructions to: receive the audio data and a time stamp attached to the audio data, output the pulse data having the predetermined length, the pulse data being output when the audio device receives the audio data, detect end time of the pulse data, compare the end time of the pulse data and the time stamp, adjust the audio data based on the comparing result, output the adjusted audio data and an audio clock, the adjusted audio data being output after the pulse data is output, and adjust a speed of the audio clock when there is a phase difference between the audio clock and the time stamp.

Other objects and aspects of the invention will be understood by the detailed description of the invention.

DETAILED DESCRIPTION OF THE INVENTION

Overall Configuration of the System

Figure 1:
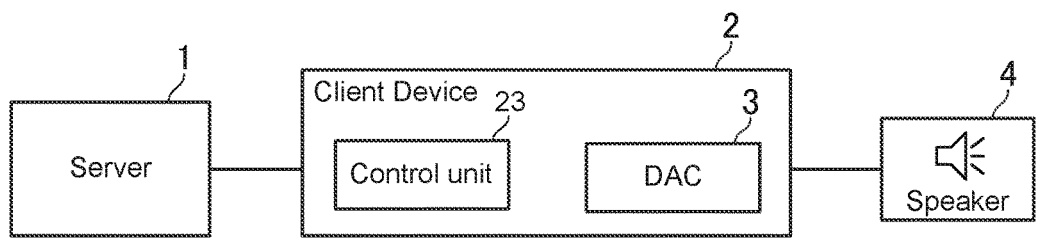
FIG. 1 shows related art.
Figure 2:
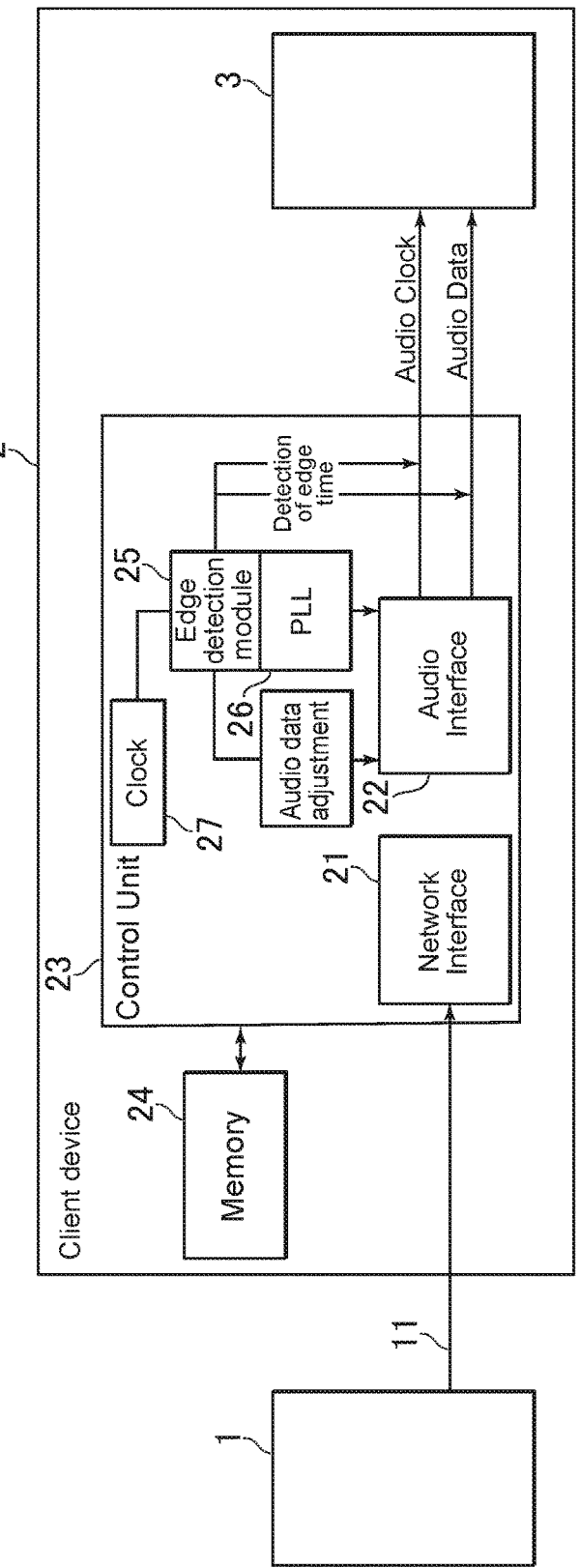
FIG. 2 shows an overall configuration of an embodiment of the system.

FIG. 2 shows an overall configuration of the system. A server 1 transmits audio data and a time stamp attached to the audio data to a client device 2 through a communication network 11 (either a wireless network or a wired network). The client device 2 receives the audio data and the time stamp attached to the audio data through a network interface 21, and modifies the audio data so that output time of the audio data is synchronized with the server 1. The client device 2 also generates an audio clock which indicates a timing of the playback of the audio data. The client device 2 changes a speed of the audio clock so that the phase difference between the time stamp and the audio clock is eliminated. The details of these processes will be explained later. The audio clock and the processed audio data are transmitted to a Digital Analog Converter (DAC) 3 through an audio interface 22. The DAC 3 converts the received audio data into an analog audio signal with a timing indicated by the audio clock. After the audio data is processed at the DAC 3, the audio signal is sent to a speaker (not shown) for playback. Further, in addition to outputting the audio data to the client device 2, the server 1 also outputs the audio data for the playback.

As shown in FIG. 2, the client device 2 includes one or more control unit 23 (e.g., CPU: Central Processing Unit) and a memory 24 such as ROM and RAM, where programs and necessary data are stored. The control unit 23 performs the functions of the client device 2 by executing the program stored in the memory 24. For example, the control unit 23 includes an edge detection module 25, which detects an edge time of the pulse data, which is output prior to the audio data, and also detects an edge time of the audio clock. The control unit 23 also includes a Phase Locked Loop (PLL) 26, which generates an audio clock and adjusts a speed of the audio clock. In addition, the control unit 23 includes a clock 27 which is used for detecting the edge time of the audio clock and the edge time of pulse data. The clock 27 is different from a clock used for the overall system. The audio data is processed in view of the detection results of the edge detection module 25 at the "Audio data adjustment" section, as shown in FIG. 2. The details of the functions of the control unit 23 will be described later.

The server 1 has a similar hardware structure as the client device 2. The clock of the server 1 and the clock 27 of the client device 2 have common time information, and the clock of the server 1 and the clock 27 of the client device 2 are adjusted so that both clocks indicate same time. For example, the server 1 periodically sends a synchronizing signal, which includes time information, to the client device 2. Then, the clock 27 in the client device 2 is adjusted based on the time information included in the synchronization signal.

The control unit 23 is not limited to the CPU, and a processor or a microcomputer may be used as the control unit 23.

In this disclosure, the edge detection module 25 and the PLL 26 perform important functions and will be explained below.

Edge Detection Module

The edge detection module 25 constantly monitors an amplitude of the data signal, and detects a point where the amplitude of the data signal changes from zero to a predetermined value (e.g., from 0 to +1). Then, the edge detection module 25 determines that the point where the amplitude of the data increased by the predetermined value is an edge. Here, as an example in this disclosure, the predetermined value is not zero. Thus, for example, in FIG. 3A, the edge detection module 25 determines that point A is an edge. Then, by referring to the clock 27, the edge detection module 25 detects a time of point A (in other words, detecting an edge time of the pulse data Dp).

Figure 3A:
FIG. 3A and FIG. 3B show examples of how an edge detection module works.
Figure 3B:
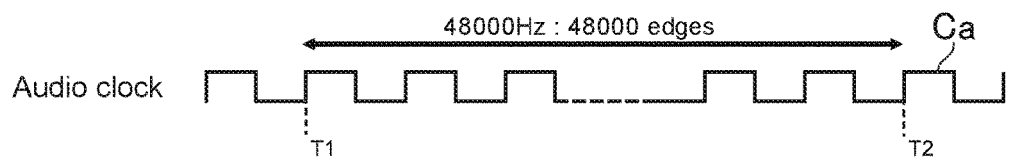

Thus, in this disclosure, by using this function, the edge detection module 25 detects (i) an edge of the pulse data, where the pulse data is used to determine a cueing position of the audio data (FIG. 3A shows one example of the pulse data Dp). Then, by referring to the clock 27, the edge detection module 25 determines an edge time of the pulse data. The edge detection module 25 also detects (ii) an edge of the audio clock, which is generated in the client device 2, and then detects an edge time of the audio clock by referring to the clock 27 (FIG. 3B shows one example of the audio clock Ca). The detected edge time of the audio clock and the time stamp attached to the audio data are used for determining a phase difference between the time stamp attached to the audio data and the audio clock, which will be explained in detail later.

The edge detection module 25 can detect a time of each edge when the data signal has a plurality of edges. Further, the edge detection module 25 also can detect the edge time every predetermined interval. For example, as shown in FIG. 3B, when the audio clock Ca has a frequency of 48 kHz, the edge detection module 25 can detect the edge time every 48000 edges. Thus, in FIG. 3B, the edge detection module 25 detects T1 and T2.

Figure 4:
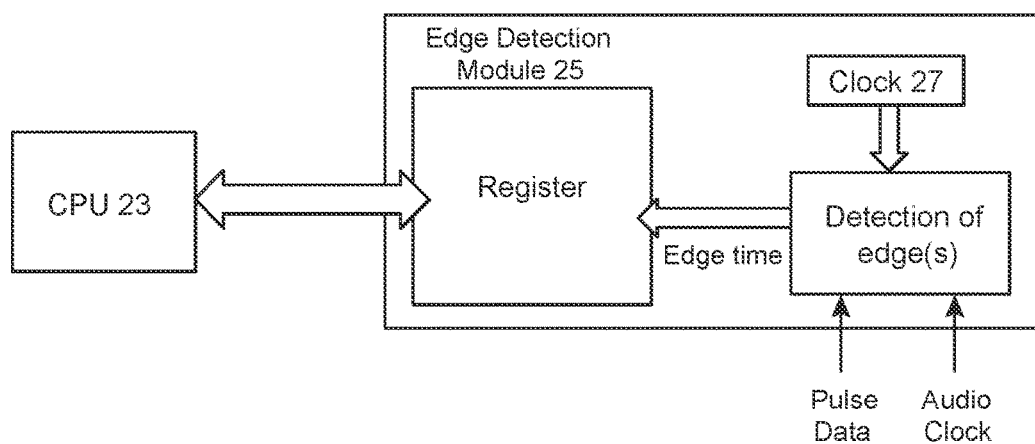
FIG. 4 shows another example of the edge detection module.

The edge detection 25 module does not necessarily have to be installed in the control unit 23 such as the CPU, and the client device 2 may implement the edge detection module 25 separately from the control unit 23. FIG. 4 shows one example where the edge detection module 25 is separately formed from the CPU 23, which works as the control unit. As shown in FIG. 4, the edge detection module 25 detects the edge of the pulse data and the edge of the audio clock, and then by referring to the clock 27, the edge detection module 25 detects the edge time of the audio clock and the edge time of the pulse data. Then, the detected results such as the edge times are sent to a register. The CPU 23 controls the edge detection module 25 and reads out the detected results (i.e., the edge times) through the register. When the edge detection module 25 is formed separately from the CPU 23 as shown in FIG. 4, the edge detection module 25 may be connected to the CPU of the existing device. Thus, it becomes easier to form the client device 2 with the edge detection function by using the existing client device. Further, the central unit 23 may have two CPUs, one of the two CPUs having the edge detection module 25 (or an edge detection function) and the other CPU having the PLL 26. The advantages discussed above (i.e., forming the client device 2 with the edge detection function by using the existing client device) also apply to this embodiment. The processor or the microcomputer may be used as the control unit instead of the CPU.

The clock 27 is used when detecting the edge time of the audio clock and the edge time of the pulse data, and is different from a clock used for the overall system. Each client device 2 has the respective clock 27. The clock 27 may also be implemented outside of the edge detection module 25.

Phase-Locked-Loop (PLL)

A Phase-Locked-Loop (PLL) 26 has a function which controls a speed (in other words, a frequency) of the audio clock, and thus generates a changeable audio clock. That is, the PLL 26 generates and outputs the audio clock (e.g., 1,0,1,0,1,0,1,0 . . . ) which is timing information of the audio data. FIG. 3B shows one example of the audio clock Ca. The audio clock Ca has a predetermined frequency (e.g., 48 kHz). Then, when there is the phase deference between the time stamp attached to the audio data and edge time (e.g., T1) of the audio clock Ca, the PPL adjusts the speed (in other words, the frequency) of the audio clock so that the edge time of the audio clock synchronizes with the time stamp of the audio data within a predetermined period. Here, as discussed above, the edge detection module 25 detects the edge time (e.g., T1) of the audio clock Ca and the time stamp attached to the audio data.

Concept of Synchronization

In this disclosure, the synchronization of the playback of the audio data between the server 1 and the client device 2 is performed in the following two aspects: (i) a synchronization of the output time of the audio data, thereby synchronizing the start of the playback between the server 1 and the client device 2; and (ii) deleting the phase difference between the audio data from the server 1 and the adjusted audio data by the client device 2 so that the sound may be synchronously played within a predetermined time. The synchronization of these aspects between a plurality of the client devices 2 can be also achieved.

Figure 5A:
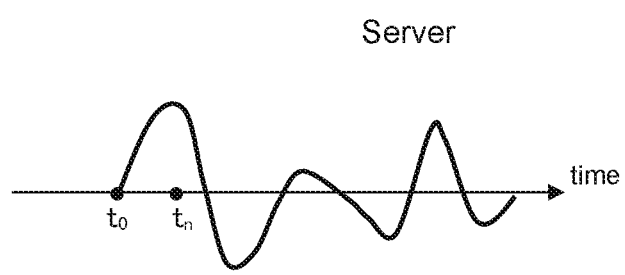
FIG. 5A and FIG. 5B show an example of synchronization.
Figure 5B:
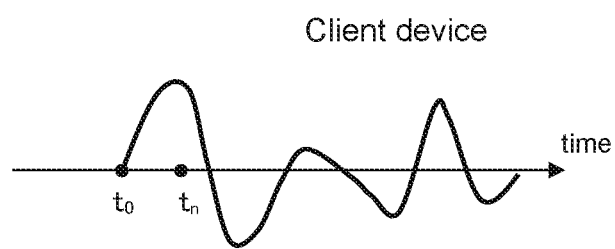

FIG. 5A and FIG. 5B show an example of the synchronization in this disclosure. In the synchronization of the output time of the audio data, a timing of the playback of the audio data in the client device 2 is adjusted so that the client device 2 outputs the audio data for the playback at the same time as the server 1 outputs the audio data for the playback, thereby the playbacks of the audio data by the server 1 and the client device 2 start at the same time ($t=t_0$), as shown in FIG. 5A and FIG. 5B. FIG. 5A shows that the start of the playback of the audio data by the server 1 is at $t_0$, while FIG. 5B shows that the client device 2 starts the playback of the audio data at $t_0$.

In addition, because each of the server 1 and the client device 2 generates a respective audio clock, a phase difference is likely to occur between the audio clock of the server 1 and the audio clock of the client device 2. Thus, in the production of the sound at the same timing (in other words, eliminating the phase difference), the speed of the audio clock transmitted from the client device 2 is controlled so that the phase difference between the time stamp attached to the audio data and the edge time of the audio clock is eliminated within a predetermined time, thereby the server 1 and the client device 2 produce the same sound within the predetermined period (e.g., $t=tn$) as shown in FIG. 5A and FIG. 5B.

Next, the steps to synchronize the output time of the audio data (i.e., synchronizing the starting time of the playback of the audio data) between the server 1 and the client device 2 and the steps to eliminating the phase difference between the server 1 and the client device 2 will be explained.

Steps of Synchronizing the Output Time of the Audio Data

Figure 6:
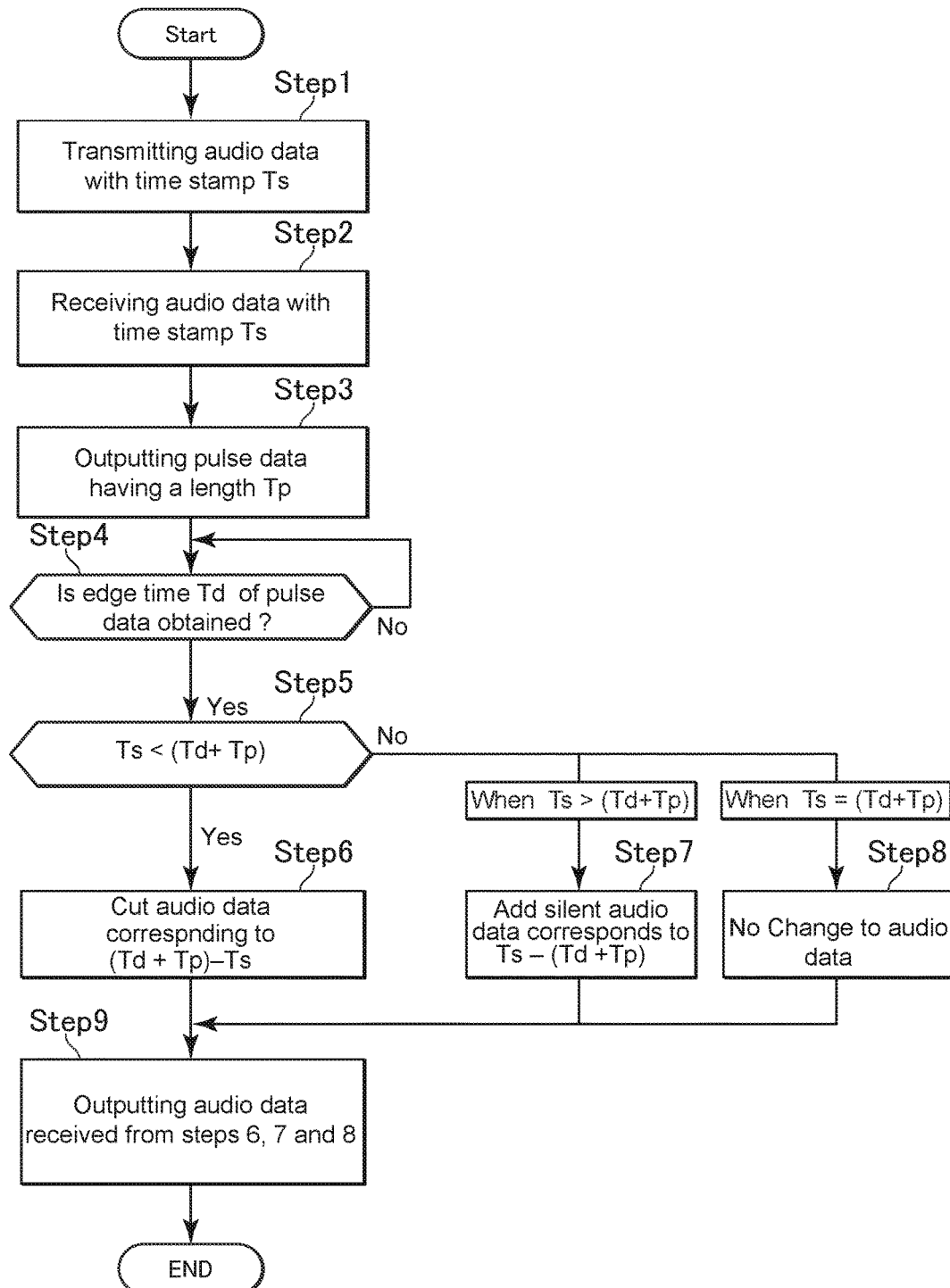
FIG. 6 shows steps of synchronizing an output time of the audio data between the server and the client device.

FIG. 6 shows steps of synchronizing an output time of the audio data between the server 1 and the client device 2. The steps show how the received audio data is modified so that the client device 2 outputs the audio data at the same time with the server 1 (or the synchronization occurs at the time when the client device 2 starts outputting the audio data), thereby synchronizing the start time of the playback of the audio data between the server 1 and the client device 2. In this embodiment, it is assumed that the CPU 23 performs the steps as the control unit by executing the program stored in the memory 24. The steps proceed as follows.

At step 1, the server 1 transmits the audio data Da, where a time stamp Ts is attached. At step 2, the client device 2 receives the audio data Da with the time stamp Ts transmitted from the server 1 (see "Requested data timing" of FIGS. 8A, 8B and 8C).

Figure 7:
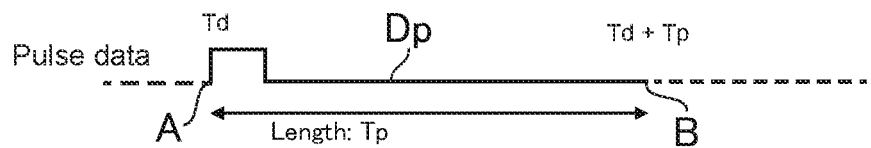
FIG. 7 shows an example of pulse data.

At step 3, once the client device 2 receives the audio data Da which has the time stamp Ts, the client device 2 outputs pulse data Dp (1,0,0,0 . . . ), as shown in FIG. 7. The pulse data Dp has a predetermined length Tp with a starting point A and an end point B. The pulse data Dp is used to determine the output time of the audio data from the client device 2, which will be discussed later. The length Tp of the pulse data Dp is determined based on the time stamp of the past audio data. One example of the length Tp of the pulse data Dp is 10 msec (millisecond). However, the length Tp of the pulse data Dp is not limited to this length, and the pulse data Dp may have any length as long as it performs its intended purpose. The pulse data Dp is stored in the memory 24 and is output once the client device 2 receives the audio data Da having the time stamp Ts from the server 1.

As shown in FIG. 7 (see also FIG. 3A), at the starting point A, an amplitude of the pulse data Dp increases from 0 to +1 (in other words, the amplitude increases by +1). Thus, at step 4, the edge detecting module 25 determines that the starting point A of the pulse data Dp is an edge, and thus detects edge time Td of the pulse data Dp by referring to the clock 27. The edge time Td is a start time of the pulse data Dp. This step is repeated until the edge time Td is detected. Once the edge time Td is detected, the process proceeds to step 5.

At step 5, the CPU 23 compares the time stamp Ts attached to the audio data Da and (Td+Tp), and determines whether Ts<(Td+Tp) or not. Here, (Td+Tp) is time of the end point B of the pulse data Dp. Thus, (Td+Tp) is the end time of the pulse data Dp. Thus, in this step 5, it is determined whether the time stamp Ts attached to the audio data is earlier than the end time (Td+Tp) of the pulse data Dp or not. The end time (Td+Tp) of the pulse data Dp is calculated by adding the predetermined length Tp to the start time Td (=Td+Tp). The end time (Td+Tp) of the pulse data Dp is used to determine the output time of the audio data, as explained below.

At step 6, when Ts<(Td+Tp), the CPU 23 cuts the audio data for an amount corresponding to the period of [(Td+Tp)−Ts]. Here, Ts<(Td+Tp) means that the time stamp Ts attached to the audio data is earlier than the end time (Td+Tp) of the pulse data Dp, as shown in FIG. 8A.

Figure 8A:
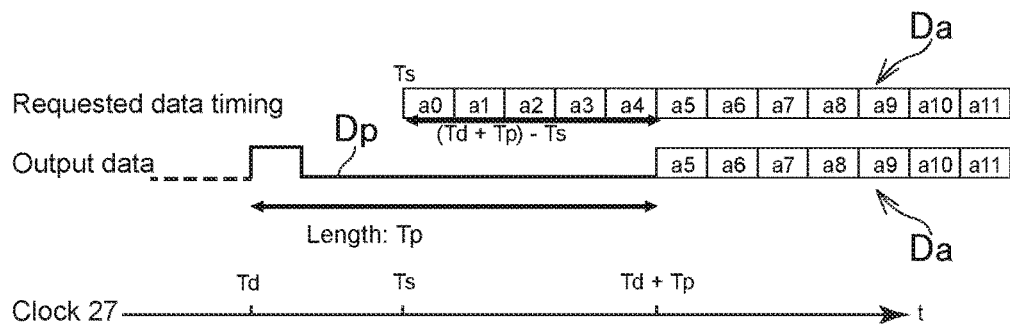
FIG. 8A, FIG. 8B and FIG. 8C show examples of how to adjust the audio data.

FIG. 8A shows an example of how to adjust the audio data in step 6. FIG. 8A shows the audio data Da (a0, a1, a2, a3, a4, a5, a6, a7, a8, a9, a10, a11) which the client device 2 receives (see "Requested data timing"), and the audio data Da (a5, a6, a7, a8, a9, a10, a11) and the pulse data Dp, which the client device 2 outputs (see "Output data"). These data are shown in line with time (t) of the clock 27. The time stamp Ts, which is attached to the audio data Da (a0, a1, a2, a3, a4, a5, a6, a7, a8, a9, a10, a11) indicates the requested timing of the playback of the audio data Da. As shown in FIG. 8A, the time stamp Ts is earlier than the end time (Td+Tp) of the pulse data Dp, and the audio data Da of a0, a1, a2, a3, a4 corresponds to [(Td+Tp)−Ts]. Thus, the audio data Da of a0, a1, a2, a3, a4 is cut, and the audio data Da of a5, a6, a7, a8, a9, a10, a11 is output after the pulse data Dp (see "Output data"). By cutting a0, a1, a2, a3, a4 (which corresponds to the period of [(Td+Tp)−Ts]), the output time of the audio data Da (a5, a6, a7, a8, a9, a10, a11) in the client device 2 is set to be at the end time (Td+Tp) of the pulse data Dp (see "Output data"). Thus, at the end time (Td+Tp) of the pulse data Dp, the output time of the audio data Da (a5, a6, a7, a8, a9, a10, a11) matches between the server 1 and the client device 2. Accordingly, the starting time of the playback of the audio data Da (a5, a6, a7, a8, a9, a10, a11) is synchronized between the server 1 and the client device 2. Further, the end of time (Td+Tp) of the pulse data Dp is an actual start time of outputting the audio data Da (a5, a6, a7, a8, a9, a10, a11) in the client device 2, and thus the synchronization is achieved from the time when the client device 2 starts outputting the audio data Da (a5, a6, a7, a8, a9, a10, a11).

The synchronization can be also achieved even where there are a plurality of client devices 2 because each client device 2 can adjust the output time of the audio data Da based on its own situation.

At step 7 shows the situation where Ts>(Td+Tp), the CPU 23 adds silent audio data for a period corresponds to the period of [Ts−(Td+Tp)]. The silent audio data is audio data which generates no sound when it is under the playback. Here, Ts>(Td+Tp) means that the time stamp Ts attached to the audio data Da is later than the end time (Td+Tp) of the pulse data Dp, as shown in FIG. 8B.

Figure 8B:
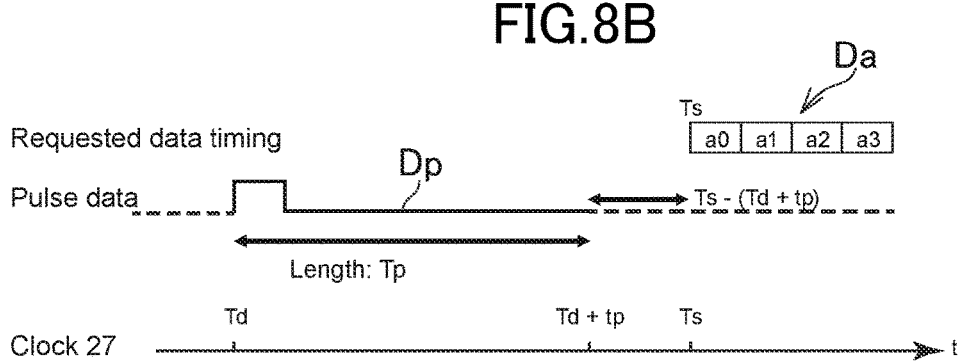
Figure 8C:
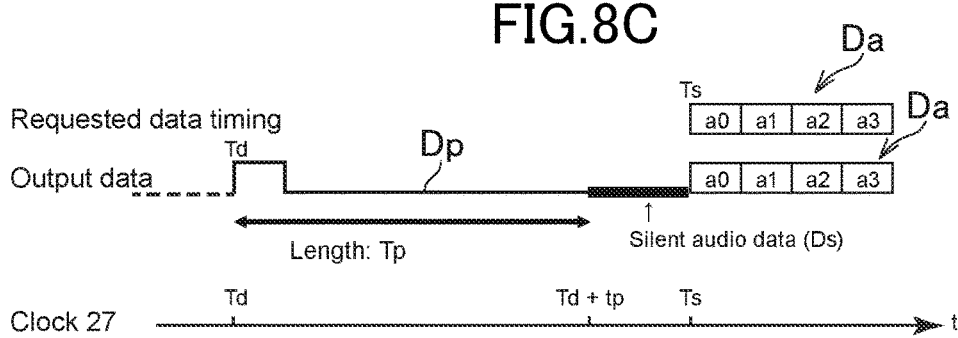

FIG. 8B and FIG. 8C show an example of how to adjust the audio data in step 7. FIG. 8B shows that the time stamp Ts attached to the audio data Da (a0, a1, a2, a3), which the client device 2 receives (see 'Requested data timing"), is later then the end time (Td+Tp) of the pulse data Dp (see "Pulse data"; see also time (t) of "clock 27"). Thus, in this case, the CPU 23 adds silent audio data Ds, which corresponds to the period of [Ts−(Td+Tp)], to a beginning of the audio data Da (a0, a1, a2, a3), as shown in FIG. 8C. Then, the CPU 23 outputs the audio data Da (a0, a1, a2, a3) after the silent audio data De, which is outputted after the pulse data Dp. Accordingly, by adding the silent data Ds, the client device 2 starts outputting the audio data Da (a0, a1, a2, a3) at the same time (i.e., at Ts) with the server 1, thereby synchronizing the starting time of the playback with the server 1. The silent audio data De is initially stored in the memory 24 and is output when necessary. The synchronization can also be achieved even if there are a plurality of client devices 2 because each client device 2 can adjust the starting time based on its own situation.

Step 8 shows the situation where Ts=(Td+Tp). Thus, because the time stamp Ts of the audio data Da corresponds to the end time (Td+Tp) of the pulse data Dp, it is not necessary to adjust the audio data Da. Thus, the CPU 23 outputs the audio data Da without any modification.

The steps 6, 7 and 8 are performed in "Audio data adjustment" section in FIG. 2.

At step 9, the CPU 23 outputs the audio data Da and the pulse data Dp received from steps 6, 7, and 8 through the audio interface 22 as shown in FIG. 2. As discussed above, the audio data Da may include the silent data Ds or the initial parts of the audio data Da may be cut. At this step, the phase difference Df between the time stamp Ts and the audio clock is not adjusted yet (which will be performed in the following steps).

As discussed above, by using the pulse data Dp, the output time of the audio data Da is precisely adjusted based on the end time (Td+Tp) of the pulse data Dp at the client device 2. Thus, the starting time of the playback of the audio data Da is synchronized between the server 1 and the client device 2. In addition, the edge detection module 25 detects the edge time Td (i.e., the starting time) of the pulse data Dp, which subsequently utilized to calculate the end time (Td+Tp) of the pulse data Dp. Thus, the edge detection module 25 ensures the above results.

Further, the synchronization can be also achieved even when there are a plurality of client devices 2, because each client device 2 can adjust its output time of the audio data based on its own situation, and the server 1 is not required to take any measures. In addition, as discussed above, the processor or the microcomputer may work as the control unit. Thus, the processor or the microcomputer, instead of the CPU, may perform the above functions in the client device 2.

Phase Synchronization Steps

The time stamp attached to the audio data is requested timing of the playback from the server 1. The edge time of the audio clock is timing information which indicates an actual playback time) of the audio data from the client device 2. Thus, the phase difference occurs when the edge time of the audio clock does not match the time stamp attached to the audio data.

Figure 9:
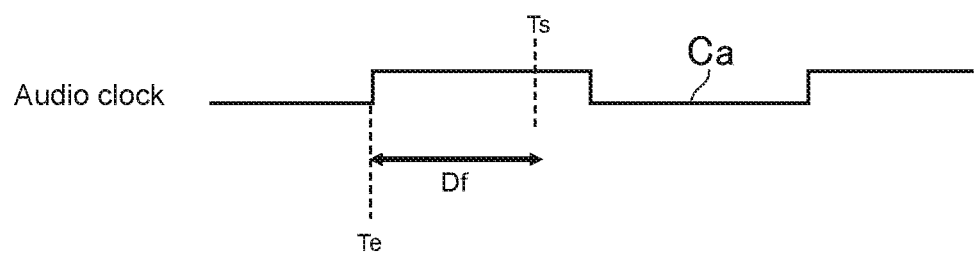
FIG. 9 shows a phase difference between the audio clock and the time stamp.

FIG. 9 illustrates the phase difference Df (i.e., difference between the time stamp Ts and the edge time Te), which is calculated by using the edge detection module 25. The edge detection module 25 detects edge time Te of the audio clock Ca by referring to the clock 27. Then, the CPU 23 calculates the difference between time stamp Ts and the edge time Te, and the difference between the time stamp Ts and the edge time Te of the audio clock becomes the phase difference Df.

The phase difference Df can be expressed by using (Ts−(Td+Tp)) or ((Td+Tp)−Ts) as follows:

Df=(Ts−(Td+Tp)) mod (1/Fs) or Df ((Td+Tp)−Ts)) mod (1/Fs), where mod is the modulo operation (sometimes called "modulus"), and Fs is a frequency of the audio data, which is constant and fixed in value. Thus, in the above step 9, the CPU 23 outputs the audio data which has the phase difference Df, which is expressed by the above equation.

Further, because the phase difference Df is a difference between the edge time Te of the audio clock Ca and the time stamp Ts, the phase difference Df depends on the speed of the audio clock Ca. Thus, the CPU 23, through controlling the PLL 26, adjusts the speed of the audio clock Ca so that the edge time Te of the audio clock Ca corresponds to the time stamp Ts.

Figure 10:
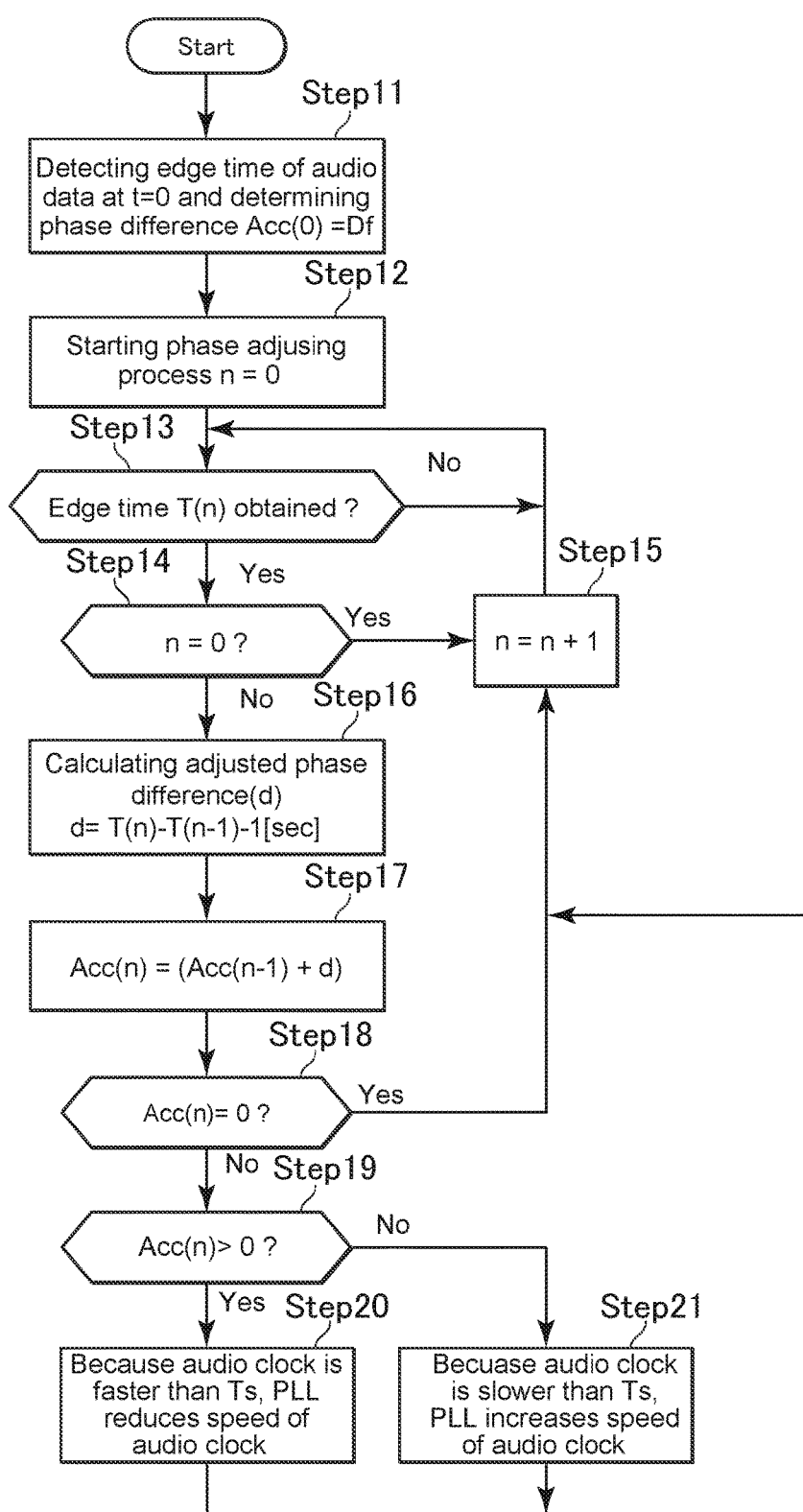
FIG. 10 shows one example of a phase adjusting process.

FIG. 10 shows one example of a phase adjusting process. The steps disclose an example of how the speed of the audio clock is adjusted so that the edge time Te of the audio clock Ca corresponds to the time stamp Ts, thereby eliminating the phase difference Df between the server 1 and the client device 2. In this embodiment, it is assumed that in "n" seconds after outputting an initial audio clock, the edge time Te of the audio clock Ca matches the time stamp Ts (note: n≥2, and is integral). The audio clock Ca has a frequency of 48 kHz, which means there are 48,000 edges per second; and the edge detection module 25 detects the edge time every 48000 edges (see FIG. 3B). Thus, the edge detection module 25 detects the edge time every one second.

Further, in this embodiment, it is assumed that the CPU 23 performs the steps as the control unit by executing the program stored in the memory 24. The steps proceed as follows.

At step 11, the edge detection module 25 detects the edge time Te of the audio clock Ca at t=0 by referring to the clock 27, and determines the phase difference Df. Then, the CPU 23 determines that the phase difference Df at t=0 is Acc (0).

Figure 11A:
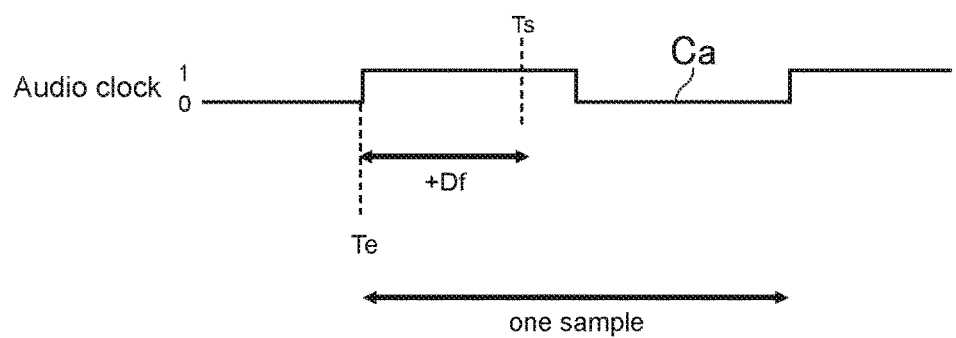
FIG. 11A shows a positive phase difference.

FIG. 11A shows a positive phase difference. This is the situation where the time stamp Ts occurs while the audio clock Ca is at the level "1", which means that the edge time Te (in other words, the audio clock Ca) is faster than the time stamp Ts, and thus the phase difference is +Df.

Figure 11B:
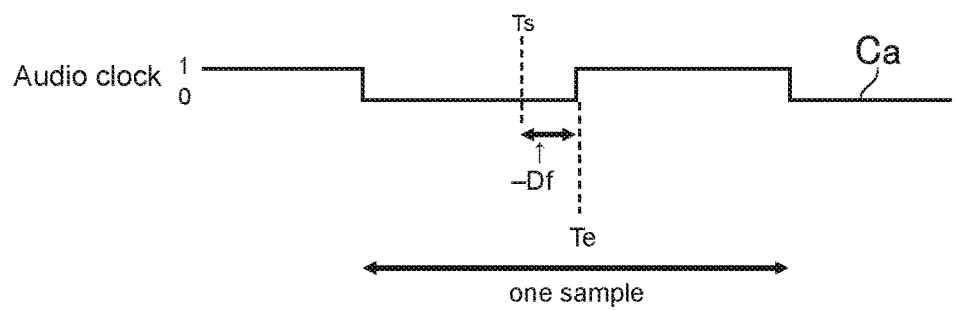
FIG. 11B shows a negative phase difference.

On the other hand, FIG. 11B shows a negative phase difference. In this situation where the time stamp Ts occurs while the audio clock Ca is at the level "0", which means that the edge time Te (in other words, the audio clock Ca) is slower than the time stamp Ts, and thus the phase difference is −Df.

As shown in FIGS. 11A and 11B, by setting the positive phase difference (+Df) and the negative phase difference (−Df), the initial phase difference Df can be set within one sample.

At step 12, the CPU 23 starts the phase adjusting process (in other words, the synchronization process of the phase difference) by n=0. At step 13, the CPU 23 determines whether the edge time T(n) is obtained or not. If the edge time T(n) is not obtained, the CPU 23 repeats this step until the edge time T(n) is obtained. If it is obtained, the process proceeds to step 14. At step 14, the CPU determines whether n=0 or not. If n=0, the process proceeds to step 15; and if n≠0, the process proceeds to step 16. At step 15, the CPU 23 adds 1 to "n," and then proceeds to step 13.

At step 16, the CPU 23 calculates an adjusted phase difference (d) between the edge time T(n) and the edge time T(n−1). Because the edge time is measured every one second, the adjusted phase difference (d) is calculated by:

$$d = T(n) - T(n-1) - 1 \text{ (second)}.$$

At step 17, based on the adjusted phase difference (d), the CPU 23 calculates the phase difference at n second: Acc (n)=Acc (n−1)+d At step 18, the CPU 23 determines whether Acc (n) 0 or not. If yes, the process proceeds to step 15. If no, the process proceeds to step 19.

At step 19, the CPU 23 determines whether Acc(n)>0 or not. This means that the CPU 23 determines whether the audio clock Ca at t=n is faster than the time stamp Ts or not. If yes, the process proceeds to step 20; and if no, the process proceeds to step 21.

At steps 20 and 21, the CPU 23, through controlling the Phase-Locked-Loop (PLL) 26, changes the speed of the audio clock Ca in view of the results of step 19 so that the phase difference Df is eliminated.

Step 20 shows the situation where Acc(n)>0, which means that the phase difference A(n) is positive. Thus, the edge time Te (in other words, the audio clock Ca) is faster than the time stamp Ts, as shown in FIG. 11A. Thus, the CPU 23, through controlling the PLL 26, reduces the speed of the audio clock Ca. In other words, the PLL 26 decreases the frequencies of the audio clock Ca. Then, the process returns to step 15.

Step 21 shows the situation where Acc(n)<0, which means that the edge time Te (in other words, the audio clock Ca) proceeds slower than the time stamp Ts, as shown in FIG. 11B. Thus, the CPU 23, through controlling the PLL 26, increases the speed of the audio clock Ca. In other words, the PLL 26 increases the frequencies of the audio clock Ca. Then, the process returns to step 15.

As discussed above, the edge detection module 25 constantly detects the edge time Te of the audio clock Ca and the time stamp Ts in a predetermined interval, thereby ensuring the detection of the phase difference Df. Then, based on the phase difference Df, the PLL 26 constantly adjusts the speed of the audio clock Ca (in other words, adjusting the frequencies of the audio clock Ca) so that the phase difference Df between the server 1 and the client device 2 is eliminated.

The PLL 26 generates a changeable audio clock and can change the speed or the frequencies of the audio clock by changing a PLL parameter value. The PLL 26 can change the frequencies of the audio data by the following parameters: (i) a positive parameter value, which increases the speed of the audio clock in accordance with a value of the parameter, or (ii) a negative parameter value, which reduces the speed of the audio clock in accordance with the value of the parameter. In step 20, the PLL 26 parameter is set to be a negative value, while the PLL parameter value is set to be a positive value in step 21.

By setting the appropriate parameter value, it is designed that Acc=0 at step 18. In other words, by setting the appropriate parameter value, it is possible that the initial phase difference becomes to zero at a certain point.

For example, the amount of adjustment PLL(n) at "n" seconds after outputting the initial audio clock may be set as follows:

$$PLL(n) = A \times P \times (Acc(n) + \text{Constant}) + B \times PLL(n-1) + C \times PLL(n-2).$$

where A, B and C are filter factors, and

P and Constant offset factors which indicate the relationship between phase difference Acc and the amount of the adjustment PLL (n).

Here, as one example, it is assumed that the relationship between the phase difference Acc and the amount of the adjustment PLL (n) is linear, and thus P=1, and Constant=0; and A=¼, B=½, C=¼.

Then, one example of the amount of the adjustment PLL (n) is defined as:

$$PLL(n) = \frac{1}{4} \times Acc(n) + (\frac{1}{2}) \times PLL(n-1) + (\frac{1}{4}) \times PLL(n-2).$$

where PLL (−1)=PLL (−2)=PLL (0)=0

Figure 12:
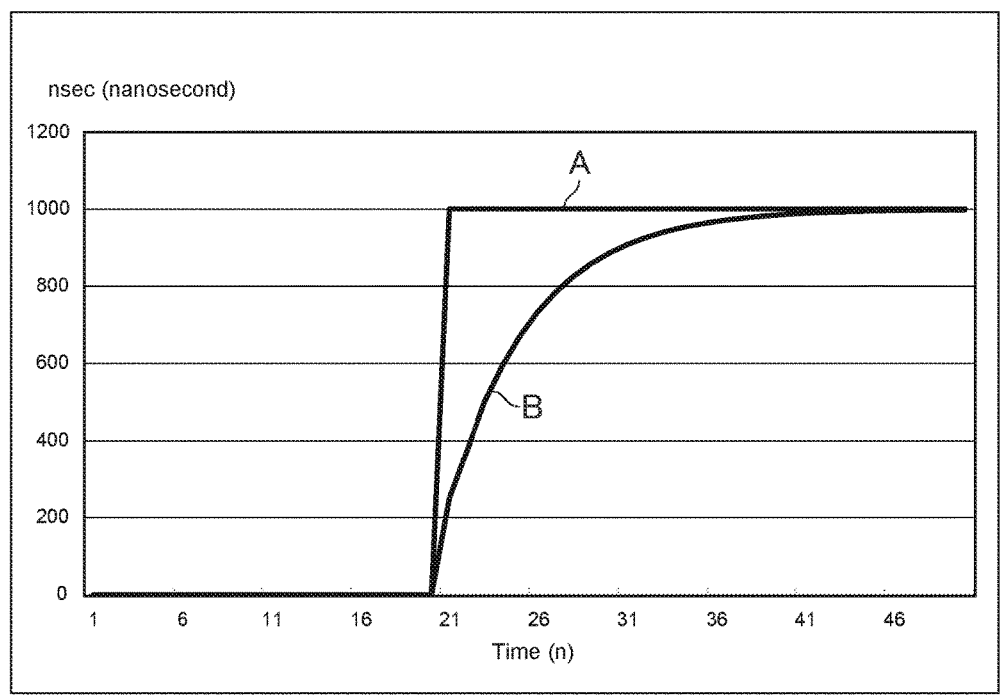
FIG. 12 shows one example of the relationship between phase difference and the amount of the adjustment by PLL control.

FIG. 12 shows one example of the relationship between the phase difference Acc (n) and the amount of the adjustment PLL(n) by PLL control. In FIG. 12, the line A shows the phase difference Acc (n) and the line B shows the amount of the adjustment PLL (n) expressed by the above equation. FIG. 12 shows how the amount of the adjustment PLL(n)

reaches to the phase difference Acc (n). As shown in FIG. 12, the amount of the adjustment PLL (n) increases gradually, which means that the speed of the audio clock is gradually changed, thereby the difference between the phase difference Acc (n) and the amount of the adjustment PLL (n) decreases gradually. Then, at a certain point (e.g., around 40 seconds), the amount of the adjustment PLL(n) becomes equal to the phase difference Acc (n), and thus the phase difference is eliminated. FIG. 12 shows an example where the phase difference is 1000 nsec (nanosecond). However, the above equation PLL (n) can be used for the situation where the phase difference is different values. The above concept applies to both where the phase difference is a positive value and where the phase difference is a negative value.

In the above embodiment, the audio clock Ca has a frequency of 48 kHz, and the edge detection module 25 detects the edge time every 48000 edges (i.e., the edge detection module 25 detects the edge time every one second). However, the audio clock Ca is not limited to a frequency of 48 kHz. Instead, the audio clock Ca may have a different frequency and the edge time may be detected at a different interval as long as the intended purpose is achieved. Further, as discussed above, the processor or the microcomputer, instead of the CPU, may perform the above steps.

Advantages

Thus, as discussed above, the client device 2 can set a specific time (i.e., at the end of the pulse data), and determine the start of the output time of the audio data based on the specific time. Thus, it is possible to precisely determine the outputting time of the audio data regardless of the delay within the client device. Further, the start time of the outputting the audio data is determined regardless of whether the time stamp attached to the audio data is earlier or later than the specific time. In addition, the client device 2 can synchronize the output time of the audio data with the server 1 from the time when the client device 2 starts outputting the audio data. Thus, it is possible to start the playback of the audio data at the same time between the server 1 and the client device 2. Further, the synchronization can be achieved even where there are a plurality of client devices 2 because each client device 2 can adjust the output time of the audio data based on its own situation.

In addition, the initial phase difference between the audio clock and the time stamp is limited to within one sample (see FIGS. 11A and 11B). Thereafter, the phase difference between the output audio clock and the time stamp is constantly monitored and the PLL adjusts the speed of the audio clock, thereby eliminating (or synchronizing) the phase difference between the server 1 and the client device 2 within a predetermined time period. Because the output audio clock is monitored, the results of the monitor reflect the actual situation of the audio clock. Thus, a reliable synchronization can be achieved by adjusting the speed of the audio clock based on the actual situation of the audio clock. This is also achieved even where there are a plurality of client devices 2, because each client device 2 can adjust the speed of the audio clock based on its own situation.

Further, when synchronizing the output time of the audio data and the phase difference between the server 1 and the client devices 2, the edge detection module can be utilized. The edge detection module detects the edge time of the pulse data and the edge time of the audio clock, thereby assuring setting the correct output time of the audio clock and detecting the correct phase difference.

In addition, the above results do not require any additional or specific modification to the server 1, and can be achieved with only the client device 2. Thus, the above features can be used when there a plurality of client devices 2.

Accordingly, the present disclosure provides the specific solutions to the technical problem related to the delay caused by the software processing within the client device 2.

In the above embodiment, the client device 2 includes the DAC 3, but does not include the speaker. However, the client device 2, the DAC and the speaker may be formed integrally as a single device. Further, the client device 2 and the DAC 3 may be formed separately. In addition, in the above embodiment, the server 1 and the client device 2 may be used for many technical fields. For example, the server 1 and the client device 2 can be connected to a stereo with a right output and left output, respectively. Further, it is possible that each of the server 1 and the client device 2 is placed in a respective room and the audience can listen to the audio data in the respective room in a synchronized manner. The audio data may be a music. However, the audio data is not limited to music and other types of the audio data can be used. In addition, it is not necessary that the only the audio data is distributed from the server 1 to the client device 2, and the principle of the present disclosure is applied for the audio data which is distributed with another data (e.g., image data) to the client device 2.

While specific embodiments of the invention have been shown and described in detail to illustrate the application of the principles of the invention, it is understood that the invention may be embodied otherwise without departing from such principles. It is further understood that the invention is not limited to the specific embodiments described herein, but is defined by the appended claims.

We claim:

1. An audio device which is configured to wirelessly receive audio data from another audio device, comprising:
    a memory which stores instructions, pulse data having a starting point and a predetermined length, and silent audio data,
    a clock which outputs an audio clock that indicates a timing of playback of the audio data, and
    a processor that is configured to execute the instructions stored in the memory to:
    wirelessly receive the audio data and a time stamp attached to the audio data from the other audio device,
    output the pulse data having the starting point and the predetermined length in the audio device, the pulse data being output when the audio device receives the audio data,
    detect start time of the pulse data based on the starting point by referring to the clock and end time of the pulse data by referring to the predetermined length and the start time,
    compare the end time of the pulse data and the time stamp,
    adjust the audio clock based on the comparing result, thereby adjusting the audio data, and
    output the adjusted audio data synchronized with the other audio device, the adjusted audio data being output after the pulse data is output,
    wherein when the time stamp is later than the end time of the pulse data, the processor is configured to (i) output the silent audio data for a period corresponding to a difference between the time stamp and the end time of the pulse data, and (ii) output the audio data after the silent audio data is output.

2. The audio device according to claim 1, wherein
the processor is configured to (i) detect the start time of the pulse data, where an amplitude of the pulse data increases by a predetermined value and (ii) detect the end time of the pulse data based on the predetermined length and the start time.

3. The audio device according to claim 1, wherein
when the time stamp is earlier than the end time of the pulse data, the processor is configured to (i) adjust the audio data by cutting the audio data for an amount corresponding to a difference between the time stamp and the end of the pulse data, and (ii) output the adjusted audio data.

4. The audio device according to claim 1, further comprising:
an additional processor that is configured to detect start time of the pulse data based on the starting point, where an amplitude of the pulse data increases by a predetermined value;
wherein the additional processor is formed separately from the processor, and
the processor is configured to (i) read out the start time of the pulse data from the additional processor, and (ii) detect the end time of the pulse data based on the predetermined length and the start time.

5. An audio device which is configured to wirelessly receive audio data from another audio device, comprising:
a memory which stores instructions, pulse data having a starting point and a predetermined length, and silent audio data,
a clock which outputs an audio clock that indicates a timing of playback of the audio data, and
a processor that is configured to execute the instructions stored in the memory to:
wirelessly receive the audio data and a time stamp attached to the audio data from the other audio device,
output the pulse data having the starting point and the predetermined length in the audio device, the pulse data being output when the audio device receives the audio data,
detect start time of the pulse data based on the starting point by referring to the clock and end time of the pulse data by referring to the predetermined length and the start time,
compare the end time of the pulse data and the time stamp,
adjust the audio clock based on the comparing result, thereby adjusting the audio data,
output the adjusted audio data synchronized with the other audio device and the adjusted audio clock, the adjusted audio data being output after the pulse data is output, and
adjust a speed of the audio clock when there is a phase difference between the audio clock and the time stamp,
wherein when the time stamp is later than the end time of the pulse data, the processor is configured to (i) output the silent audio data for a period corresponding to a difference between the time stamp and the end time of the pulse data, and (ii) output the audio data after the silent audio data is output.

6. The audio device according to claim 5, further comprising:
an additional processor that is formed separately from the processor,
wherein the additional processor is configured to detect the start time of pulse data based on the starting point, where an amplitude of the audio clock increases by a predetermined value, and
the processor is configured to (i) read out the start time of the pulse data from the additional processor and (ii) determine that there is the phase difference between the audio clock and the time stamp when the start time of the pulse data does not correspond to the time stamp.

7. The audio device according to claim 5, wherein
the processor is configured to detect the start time of the pulse data based on the starting point, where an amplitude of the audio clock increases by a predetermined value, and
the processor is configured to determine that there is the phase difference between the audio clock and the time stamp when the start time of the pulse data does not correspond to the time stamp.

8. The audio device according to claim 7, wherein
when the edge time of the audio clock proceeds faster than the time stamp, the processor is configured to decrease the speed of the audio clock, and
when the time stamp proceeds faster than the edge time of the audio clock, the processor is configured to increase the speed of the audio clock.

9. The audio device according to claim 5, wherein
when the time stamp is earlier than the end time of the pulse data, the processor is configured to (i) adjust the audio data by cutting the audio data for an amount corresponding to a difference between the time stamp and the end of the pulse data, and (ii) output the adjusted audio data.

10. A method for synchronizing audio data, the method being performed by an audio device which is configured to wirelessly receive the audio data from another audio device, the audio device comprising (i) a memory which stores instructions, pulse data having a starting point and a predetermined length, and silent audio data and (ii) a processor that is configured to execute the instructions stored in the memory, the method comprising:
outputting an audio clock that indicates a timing of playback of the audio data, the step being performed by a clock,
wirelessly receiving the audio data and a time stamp attached to the audio data from the other audio device, the step being performed by the processor,
outputting the pulse data having the starting point and the predetermined length in the audio device, the pulse data being output when the audio device receives the audio data, the step being performed by the processor,
detecting start time of the pulse data based on the starting point by referring to the clock and end time of the pulse data by referring to the predetermined length and the start time, the step being performed by the processor,
comparing the end time of the pulse data and the time stamp, the step being performed by the processor,
adjusting the audio clock based on the comparing result, thereby adjusting the audio data, the step being performed by the processor, and
outputting the adjusted audio data synchronized with the other audio device, the adjusted audio data being output after the pulse data is output, the step being performed by the processor,
wherein when the time stamp is later than the end time of the pulse data, the processor (i) outputs the silent audio data for a period corresponding to a difference between the time stamp and the end time of the pulse data, and (ii) outputs the audio data after the silent audio data is output.

11. The method according to claim 10, further comprising:

(i) detecting, by the processor, edge time of the audio clock, where an amplitude of the audio clock increases by a predetermined value, and (ii) determining, by the processor, that there is a phase difference between the audio clock and the time stamp when the edge time of the audio clock does not correspond to the time stamp.

12. The method according to claim 11, further comprising:

when the edge time of the audio clock proceeds faster than the time stamp, decreasing, by the processor, the speed of the audio clock, and when the time stamp proceeds faster than the edge time of the audio clock, increasing, by the processor, the speed of the audio clock.

13. The method according to claim 12, wherein the audio clock has a predetermined number of edges, and the method further comprising:

detecting, by the processor, a plurality of edge time, and adjusting, by the processor, the speed of the audio clock so that the phase difference is reduced each time the edge time is detected.

14. The method according to claim 10, wherein the audio device further comprises an additional processor which is formed separately from the processor, and the method further comprising:

detecting, by the additional processor, edge time of the audio clock, where an amplitude of the audio clock increases by a predetermined value, and (i) reading out, by the processor, the edge time of the audio clock from the additional processor, and (ii) determining by the processor, that there is a phase difference between the audio clock and the time stamp when the edge time of the audio clock does not correspond to the time stamp.

15. The method according to claim 14, wherein the audio clock has a predetermined number of edges, and the method further comprising:

detecting, by the additional processor, a plurality of edge time, and adjusting, by the processor, the speed of the audio clock so that the phase difference is reduced each time the additional processor detects the edge time.

* * * * *